(12) United States Patent
Hailu et al.

(10) Patent No.: US 8,025,993 B2
(45) Date of Patent: Sep. 27, 2011

(54) RECORDING MEDIA INTERLAYER STRUCTURE

(75) Inventors: Abebe Hailu, San Jose, CA (US); Weilu Xu, San Jose, CA (US); Xiaoguang Ma, Fremont, CA (US); Chung-Hee Chang, Fremont, CA (US); Shoutao Wang, Fremont, CA (US); Charles C. Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 392 days.

(21) Appl. No.: 11/709,822

(22) Filed: Feb. 23, 2007

(65) Prior Publication Data

US 2008/0204933 A1 Aug. 28, 2008

(51) Int. Cl.
*G11B 5/66* (2006.01)
(52) U.S. Cl. .................................................. 428/831
(58) Field of Classification Search .................. None
See application file for complete search history.

(56) References Cited

U.S. PATENT DOCUMENTS

| 7,175,925 | B2 | 2/2007 | Chen et al. | |
| 7,368,185 | B2* | 5/2008 | Hirayama et al. | 428/831.2 |
| 2004/0247945 | A1 | 12/2004 | Chen et al. | |
| 2006/0275629 | A1* | 12/2006 | Ikeda et al. | 428/831.2 |
| 2007/0026261 | A1* | 2/2007 | Marinero et al. | 428/831.2 |

* cited by examiner

*Primary Examiner* — Holly Rickman

(57) ABSTRACT

A perpendicular magnetic recording medium comprises a layer stack formed over a surface of a non-magnetic substrate, and comprising, in overlying sequence from the surface: a magnetically soft underlayer; an interlayer structure for crystallographically orienting a layer of a perpendicular magnetic recording material formed thereon; and at least one crystallographically oriented, magnetically hard, perpendicular magnetic recording layer on the interlayer structure; wherein the interlayer structure is a triple-layer stacked structure comprising: a first interlayer of a first non-magnetic material proximal the magnetically soft underlayer and containing Ru; a second interlayer of a second non-magnetic material in overlying contact with the first interlayer and not containing Ru; and a third interlayer of a third non-magnetic material in overlying contact with the second interlayer and containing Ru.

16 Claims, 8 Drawing Sheets

IL R1 RuX 150A / R2 Ru 110A (control)
grain size 7.72nm, sigma 1.43nm

RECORDING MEDIA INTERLAYER STRUCTURE

FIELD OF THE INVENTION

The present invention relates to improved perpendicular magnetic recording media and methods for fabricating same. The invention has particular utility in the manufacture of very high to ultra-high areal recording density media, e.g., hard disks, utilizing granular perpendicular-type magnetic recording layers.

BACKGROUND OF THE INVENTION

Magnetic media are widely used in various applications, particularly in the computer industry for data/information storage and retrieval applications, typically in disk form, and efforts are continually made with the aim of increasing the areal recording density, i.e., bit density of the magnetic media. Conventional thin film thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

Perpendicular recording media have been found to be superior to longitudinal media in achieving very high bit densities without experiencing the thermal stability limit associated with the latter. In perpendicular magnetic recording media, residual magnetization is formed in a direction ("easy axis") perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL"), i.e., a magnetic layer having a relatively low coercivity below about 1 kOe, such as of a NiFe alloy (Permalloy), between a non-magnetic substrate, e.g., of glass, aluminum (Al) or an Al-based alloy, and a magnetically "hard" recording layer having relatively high coercivity, typically about 3-8 kOe, e.g., of a cobalt-based alloy (e.g., a Co—Cr alloy such as CoCrPtB) having perpendicular anisotropy. The magnetically soft underlayer serves to guide magnetic flux emanating from the head through the magnetically hard perpendicular recording layer.

A typical conventional perpendicular recording system 20 utilizing a vertically oriented magnetic medium 21 with a relatively thick soft magnetic underlayer, a relatively thin hard magnetic recording layer, and a magnetic transducer head 16, is illustrated in FIG. 1, wherein reference numerals 10, 11, 4, 5, and 6, respectively, indicate a non-magnetic substrate, an optional adhesion layer, a soft magnetic underlayer, at least one non-magnetic interlayer (sometimes referred to as an "intermediate" or "seed", and at least one magnetically hard perpendicular recording layer with its magnetic easy axis perpendicular to the film plane.

Still referring to FIG. 1, reference numerals 7 and 8, respectively, indicate the main (writing) and auxiliary poles of the magnetic transducer head 16. The relatively thin interlayer 5, comprised of one or more layers of non-magnetic materials, serves to (1) prevent magnetic interaction between the soft underlayer 4 and the at least one hard recording layer 6; and (2) promote desired microstructural and magnetic properties of the at least one magnetically hard recording layer.

As shown by the arrows in the figure indicating the path of the magnetic flux $\phi$, flux $\phi$ is seen as emanating from the main writing pole 7 of magnetic transducer head 16, entering and passing through the at least one vertically oriented, magnetically hard recording layer 5 in the region below main pole 7, entering and traveling within soft magnetic underlayer (SUL) 3 for a distance, and then exiting therefrom and passing through the at least one perpendicular hard magnetic recording layer 6 in the region below auxiliary pole 8 of transducer head 16. The direction of movement of perpendicular magnetic medium 21 past transducer head 16 is indicated in the figure by the arrow above medium 21.

With continued reference to FIG. 1, vertical lines 9 indicate grain boundaries of polycrystalline layers 5 and 6 of the layer stack constituting medium 21. Magnetically hard main recording layer 6 is formed on interlayer 5, and while the grains of each polycrystalline layer may be of differing widths (as measured in a horizontal direction) represented by a grain size distribution, they are generally in vertical registry (i.e., vertically "correlated" or aligned).

Completing the layer stack is a protective overcoat layer 14, such as of a diamond-like carbon (DLC), formed over hard magnetic layer 6, and a lubricant topcoat layer 15, such as of a perfluoropolyether (PFPE) material, formed over the protective overcoat layer.

Substrate 10 is typically disk-shaped and comprised of a non-magnetic metal or alloy, e.g., Al or an Al-based alloy, such as Al—Mg having a Ni—P plating layer on the deposition surface thereof, or alternatively, substrate 10 is comprised of a suitable glass, ceramic, glass-ceramic, polymeric material, or a composite or laminate of these materials. Optional adhesion layer 11, if present, may comprise an up to about 200 Å thick layer of a material such as Ti, a Ti-based alloy, Cr, or a Cr-based alloy. Soft magnetic underlayer 4 is typically comprised of an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc. Interlayer 5 typically comprises an up to about 300 Å thick layer or layers of non-magnetic material(s), such as Ru, TiCr, Ru/CoCr$_{37}$Pt$_6$, RuCr/CoCrPt, etc.; and the at least one magnetically hard perpendicular recording layer 6 is typically comprised of an about 50 to about 250 Å thick layer(s) of Co-based alloy(s) including one or more elements selected from the group consisting of Cr, Fe, Ta, Ni, Mo, Pt, V, Nb, Ge, B, and Pd.

A currently employed way of classifying magnetic recording media is on the basis by which the magnetic grains of the recording layer are mutually separated, i.e., segregated, in order to physically and magnetically de-couple the grains and provide improved media performance characteristics. According to this classification scheme, magnetic media with Co-based alloy magnetic recording layers (e.g., CoCr alloys) are classified into two distinct types: (1) a first type, wherein segregation of the grains occurs by diffusion of Cr atoms of the magnetic layer to the grain boundaries of the layer to form Cr-rich grain boundaries, which diffusion process requires heating of the media substrate during formation (deposition) of the magnetic layer; and (2) a second type, wherein segregation of the grains occurs by formation of oxides, nitrides, and/or carbides at the boundaries between adjacent magnetic grains to form so-called "granular" media, which oxides, nitrides, and/or carbides may be formed by introducing a minor amount of at least one reactive gas containing oxygen, nitrogen, and/or carbon atoms (e.g. $O_2$, $N_2$, $CO_2$, etc.) to the inert gas (e.g., Ar) atmosphere during sputter deposition of the Co alloy-based magnetic layer. The latter process does not require heating of the substrate to an elevated temperature.

Magnetic recording media with granular magnetic recording layers possess great potential for achieving very high and ultra-high areal recording densities. An advantage afforded by granular recording layers is significant suppression of media noise due to great reduction in the exchange coupling between adjacent magnetic grains, resulting from the presence of non-magnetic material, typically an oxide material, at the grain boundaries. As indicated above, current methodology for manufacturing granular-type magnetic recording media involves reactive sputtering of a target comprised of the ferromagnetic material for the magnetic recording layer (typically a Co-based alloy) in a reactive gas-containing atmosphere, e.g., an atmosphere comprising oxygen or a compound of oxygen, in order to incorporate oxides in the deposited film or layer and achieve smaller and more isolated magnetic grains. Alternatively, a target comprised of the ferromagnetic material (typically a Co-based alloy) and the oxide material may be directly sputtered in an inert atmosphere or an atmosphere comprising oxygen or a compound of oxygen.

As indicated above, perpendicular magnetic recording media typically include at least one magnetically soft underlayer for guiding magnetic flux through the media and to enhance writability, at least one non-magnetic intermediate or interlayer (hereinafter referred to as "interlayer"), and at least one main recording layer. The role of the interlayer(s) is critical for obtaining good media performance. Specifically, in perpendicular magnetic recording media the interlayer(s) serve to provide:

1. control of the crystallographic orientation of the main recording layer(s);
2. control of the grain size and grain distribution of the main recording layer(s);
3. destruction of exchange coupling between magnetically hard recording layers and magnetically soft layers; and
4. physical separation between adjacent grains of the main recording layer(s), which feature is particularly desirable and important when the latter is formed by a low temperature, high gas pressure sputtering process, and/or by a reactive sputtering process, so that an oxide, e.g., Co-oxide, occurs in the boundaries between adjacent grains.

More specifically, the SMNR of perpendicular magnetic recording media is improved by increasing the strength of the preferred c-axis out-of-plane orientation of the perpendicular main recording layer(s) while maintaining a small uniform grain size of the layer(s). The preferred orientation of the magnetic layer(s) depends upon the structural properties of and the interactions between the various previously deposited underlying layers of the media, as well as upon the nature of the substrate.

In general, control of the strength (or amount) of the preferred orientation of thin-film layers is difficult. Formation of a Co-alloy magnetic recording layer with a strong <0002> growth orientation on a structure including a substrate, a soft magnetic underlayer, and non-magnetic seed and interlayers between about 0.2 and 40 nm thick is extremely difficult.

Differences in crystallographic orientation between adjacent thin film layers are affected by the surface and interfacial energies of the materials of the layers, and by heteroepitaxial (or coherent) growth of one layer upon another layer of a chemically incompatible material with related crystal lattice structure and atomic interplanar spacings.

The soft magnetic underlayer of perpendicular magnetic recording media generally is composed of a small grain or amorphous material containing at least one of Fe and Co. According to prior practice, a non-magnetic material of hcp structure, e.g., Ru, may be deposited on the soft magnetic underlayer, which non-magnetic hcp material grows with a moderately strong <0002> preferred orientation and small grain size. A magnetic material of hcp structure, typically a Co-based alloy, may grow coherently on the hcp non-magnetic layer, also with <0002> growth orientation and small grain size. The quality of the <0002> growth orientation can be determined from the size of symmetric X-ray diffraction ("XRD") peaks and rocking curves. Strong preferred growth orientation of the Co-based alloy with the hcp <0002> axis out-of-plane is generally necessary for achieving good performance of high areal recording density perpendicular magnetic media. Unfortunately, however, the quality of growth orientation of an hcp material upon the soft magnetic underlayer depends upon the selected material, and prior intermediate or underlayer structures, such as with a Ru layer and a Co-alloy layer, generally have not afforded the desired strength of <0002> growth orientation.

As indicated supra, one type of perpendicular magnetic recording media comprises Co alloy-based recording layers wherein oxides are present between adjacent magnetic grains for enhancing inter-granular separation. Such layers are typically formed by a sputtering process performed at a high pressure, e.g., about 30 mTorr, with Ru alloy-based films utilized as interlayers beneath the recording layer(s). When the Ru alloy-based interlayers are deposited, as by sputtering at a relatively high gas pressure, the physical separation between neighboring grains afforded by the oxides and/or voids promotes de-coupling of the magnetic grains and enhances the coercivity of the layer. However, the crystallographic <0002> orientations of the Ru/Co-alloy interlayer/magnetic alloy bi-layer structure are not as good as when the Ru interlayer is sputter-deposited at a lower pressure.

U.S. published patent application No. US 2004/0247945 A1, published Dec. 9, 2004, now U.S. Pat. No. 7,175,925 B2, issued Feb. 13, 2007, commonly assigned with the present application, the entire disclosure of which is incorporated herein by reference, discloses very high areal recording density perpendicular magnetic recording media with improved crystallographic orientations performance characteristics. The media disclosed therein typically utilize magnetic alloys as the material of the perpendicular recording layer(s), e.g., hcp Co-based alloys requiring strong <0002> preferred growth orientation, reliably and controllably fabricated, for example, by conventional sputtering techniques. Optimum crystallographic properties (e.g., growth orientation) and physical separation of the grains of the component crystalline layers, particularly the interlayer(s) and perpendicular recording layer(s), are obtained by means of appropriate layer design, deposition conditions, and materials selection.

Perpendicular recording media fabricated according to the abovementioned U.S. published patent application and U.S. patent include one or more of the following features:

1. a very smooth-surfaced first interlayer of a dual-layer interlayer structure, i.e., an interlayer structure comprised of a first crystalline interlayer of a non-magnetic material formed by sputter deposition in a gas atmosphere at a first pressure (e.g., not greater than about 3 mTorr) and a second crystalline interlayer of a non-magnetic material formed by sputter deposition in a gas atmosphere at a second pressure greater than the first pressure (e.g., not less than about 15 mTorr), which interlayer structure promotes and strengthens a desired out-of-plane crystallographic growth orientation of the perpendicular magnetic recording layer deposited thereon;

2. at least one very smooth-surfaced, amorphous or crystalline seed or wetting layer beneath the interlayer structure for improving magnetic and crystallographic properties of the media;

3. at least one very smooth-surfaced, magnetically soft underlayer, formed by sputtering at increased target-substrate distances (e.g., not less than about 2 in.) and at low gas pressures (relative to conventional sputtering practices), for controlling the out-of-plane crystallographic orientation of, e.g., hcp-structured interlayers and magnetic recording layers; and 4. crystalline interlayers and perpendicular magnetic recording layers formed with physically well-separated crystal grains.

Referring now to FIG. 2, schematically illustrated therein, in simplified cross-sectional view, is a portion of an embodiment of a perpendicular magnetic recording medium 20 fabricated according to the aforementioned principles. More specifically, perpendicular magnetic recording medium 20 resembles the conventional perpendicular magnetic recording medium 1 of FIG. 1, and comprises a series of thin-film layers arranged in an overlying (stacked) sequence on a suitable non-magnetic substrate 2, and includes a soft magnetic underlayer 3, an amorphous or crystalline seed layer (3A), a dual-layer, non-magnetic interlayer structure 4' according to the therein disclosed invention, a perpendicularly oriented, magnetically hard (main) granular recording layer 5, a protective overcoat layer 11, typically comprised of a carbon (C)-containing material, such as diamond-like carbon (DLC), and a lubricant topcoat layer 12, typically comprised of a perfluoropolyether compound.

When utilized in hard disk applications, the non-magnetic substrate 2 is sufficiently thick as to provide medium 20 with a desired rigidity and comprises a material selected from the group consisting of: Al, NiP-plated Al, Al—Mg alloys, other Al-based alloys, other non-magnetic metals, other non-magnetic alloys, glass, ceramics, polymers, glass-ceramics, and composites and/or laminates thereof. Substrate 2 may further comprise, in overlying sequence from the surface thereof, a plating layer 2A and an adhesion layer 2B. A suitable material for plating layer 2A, as when substrate 2 is comprised of Al or an Al alloy, such as Al—Mg, is amorphous NiP, and suitable materials for adhesion layer 2B include Cr, CrTi, Ti, and TiNb.

Overlying substrate 2 is a magnetically soft underlayer 3, from about 50 to about 400 nm thick, preferably from about 80 to about 200 nm thick, typically comprised of at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, and FeCoTaZr, and a laminated structure comprised of a plurality of magnetic layers, each comprised of at least one of the recited magnetic materials and spaced-apart by thin spacer layers each comprised of at least one material selected from the group consisting of Ta, C, and Si or thin anti-ferromagnetic coupling (AFC) layers, each comprised of at least one material selected from the group consisting of Ru and IrMn.

An optional amorphous or crystalline seed or wetting layer 3A from about 1 to about 5 nm thick, preferably about 1-2 nm thick, and comprised of at least one material selected from the group consisting of: Ta, Au, Cu, Pd, Pt, TiCr, and Ag, may overlie the soft magnetic underlayer 3, wherein the combination of the soft magnetic underlayer 3 and the amorphous or crystalline seed layer 3A provides a smoother surface for subsequent layer deposition thereon than is possible with the soft magnetic underlayer alone.

A non-magnetic interlayer structure 4' is interposed between the magnetically soft underlayer 3 (or an overlying amorphous or nano-crystalline seed layer 3A as described supra) and the magnetically hard (main) granular perpendicular recording layer 5, which non-magnetic interlayer structure 4' is described in detail below.

Magnetically hard, granular perpendicular recording layer 5 overlying the non-magnetic interlayer structure 4' is from about 5 to about 25 nm thick, preferably from about 7 to about 11 nm thick, and includes at least one layer comprised of at least one magnetic material selected from the group consisting of: Co-based magnetic alloys including one or more elements selected from the group consisting of: (1) Cr, Fe, Ta, Ni, Mo, Pt, V, Nb, Ge, Si, Al, B, Ti, Zr, Hf, and Pd; (2) oxides of the Co-based magnetic alloys; (3) iron nitrides; and (4) iron oxides. Preferably, perpendicular recording layer 5 includes at least one layer of an hcp ferromagnetic alloy material with strong <0002> preferred growth orientation, preferably comprised of Co containing at least one element selected from the group consisting of Pt, Cr, Ta, B, Cu, W, Mo, and Nb.

Completing the layer stack of medium 20 are protective overcoat layer 11 atop recording layer 5, typically a layer of a carbon-containing material<100 Å thick, and a lubricant topcoat layer 12 atop the protective overcoat layer 11, typically a layer of a perfluoropolyether<50 Å thick.

Interlayer structure 4' is a bi-layer structure having an overall (i.e., combined) thickness of from about 4 to about 50 nm, preferably about 10-20 nm, which bi-layer structure, inter alia, crystallographically orients out-of-plane growth of the at least one overlying granular perpendicular magnetic recording layer 5 along a preferred growth direction. In accordance with preferred embodiments of the invention, bi-layer structure 4' is utilized together with the aforementioned hcp Co-containing magnetic alloys with <0002> preferred out-of-plane growth orientation, and comprises, in overlying sequence from the amorphous or nano-crystalline seed layer 3A:

(a) a first crystalline interlayer 4A of a non-magnetic material from about 2 to about 40 nm thick and formed, e.g., by sputtering, in a gas atmosphere at a first pressure less than about 5 mTorr; and (b) a second crystalline interlayer 4B of a non-magnetic material from about 2 to about 25 nm thick and formed, e.g., by sputtering, in a gas atmosphere at a second pressure greater than the first pressure, i.e., at least about 15 mTorr, illustratively ~30 mTorr.

The first and second interlayers 4A and 4B can also be formed by sputter depositing under a continuously increasing gas pressure, commencing with the first (i.e., initial), lower pressure and terminating with the second (i.e., final), higher pressure, which second pressure is preferably at least 10 times greater than the first pressure. When fabricated in this manner, no sharp transition or interface is formed between the first and second interlayers.

Alternatively, interlayers 4A and 4B may be formed by sputter deposition such that a distinct transition layer is present between the first and second interlayers, which transition layer is formed at a transitional gas pressure.

Preferably, each of the crystalline interlayers 4A and 4B is comprised of a non-magnetic material selected from the group consisting of Ru, RuCr, other Ru-based alloys, CoCrRu, Ti, CoCr, CoCrPt, CoCrTa, and CoCrMo. Adjacent grains of the second crystalline interlayer 4B and the overlying at least one crystalline perpendicular granular magnetic recording layer 5 are physically well-separated, as by the presence of oxide(s) and/or voids at the grain boundaries.

Each of the constituent thin film layers 2A, 2B, 3, 3A, 4A, 4B, 5, and 11 of the layer stack of medium 20 is preferably formed by sputtering, and lubricant topcoat 12 may be formed in conventional fashion, e.g., by dipping, spraying, or vapor deposition.

While the above-described hcp structured dual Ru interlayer media featuring a lower pressure first Ru interlayer in combination with a higher pressure second Ru interlayer demonstrate significant improvement in bit error rate ("BER") and media signal-to-noise ratio ("SMNR") over conventional single interlayer media, the current high market demand for Ru has led to sharp increases in its cost to unacceptable levels for either the short or long term. As a consequence, replacement of at least a portion of the Ru required for interlayer formation in high performance granular perpendicular recording media without compromising the improved BER and SMNR performance is considered imperative from an economic standpoint.

In view of the above-demonstrated critical nature of the interlayer in obtaining high performance granular perpendicular magnetic recording media, there exists a clear need for improved interlayer structures for facilitating highly oriented crystal growth thereon, and for highly crystallographically oriented granular perpendicular magnetic recording media comprising improved interlayer structures for providing enhanced performance characteristics at lower manufacturing cost than presently possible with Ru-containing interlayer structures.

The present invention, therefore, addresses and solves problems attendant upon the design and manufacture of improved film or layer structures for facilitating highly oriented crystal growth and fabrication of high performance, ultra-high areal recording density granular perpendicular magnetic recording media, while maintaining full compatibility with the economic requirements of cost-effective, large-scale, automated manufacturing technology.

DISCLOSURE OF THE INVENTION

An advantage of the present invention is improved perpendicular magnetic recording media.

Another advantage of the present invention is improved perpendicular magnetic recording media which can be fabricated in cost-effective manner.

Still another advantage of the present invention is improved perpendicular magnetic recording media with reduced Ru content multi-layer interlayer structures.

A further advantage of the present invention is a method of manufacturing improved perpendicular magnetic recording media.

A still further advantage of the present invention is a method of manufacturing improved perpendicular magnetic recording media in cost-effective manner.

Yet another advantage of the present invention is a method of manufacturing improved perpendicular magnetic recording media with reduced Ru content multi-layer interlayer structures.

These and additional advantages and other features of the present invention will be set forth in the description which follows and in part will become apparent to those having ordinary skill in the art upon examination of the following or may be learned from the practice of the invention. The advantages of the present invention may be realized as particularly pointed out in the appended claims.

According to an aspect of the present invention, the foregoing and other advantages are obtained in part by an improved perpendicular magnetic recording medium, comprising:

(a) a non-magnetic substrate having a surface; and (b) a layer stack formed over the substrate surface, the layer stack comprising, in overlying sequence from the substrate surface;

(i) a magnetically soft underlayer;

(ii) an interlayer structure for crystallographically orienting a layer of a perpendicular magnetic recording material formed thereon; and (iii) at least one crystallographically oriented, magnetically hard, perpendicular magnetic recording layer on the interlayer structure;

wherein the interlayer structure is a triple-layer stacked structure comprising:

(1) a first interlayer of a first non-magnetic material proximal the magnetically soft underlayer, the first non-magnetic material containing Ru;

(2) a second interlayer of a second non-magnetic material in overlying contact with the first interlayer, the second non-magnetic material not containing Ru; and (3) a third interlayer of a third non-magnetic material in overlying contact with the second interlayer, the third non-magnetic material containing Ru.

In accordance with embodiments of the present invention, the first non-magnetic material is of general formula RuX, where X is at least one element selected from the group consisting of: Mo, Ni, Cr, W, Zr, and Re; the second non-magnetic material is of general formula Y, where Y is at least one element or alloy selected from the group consisting of: Mo, Cr, Ni, Ti, W, Zr, CrMo, CrW, CrMoZr, and NiMo; and the third non-magnetic material is selected from the group consisting of: Ru, RuCr, RuMo, and RuW.

According to embodiments of the present invention, the first interlayer is from about 0.5 to about 50 nm thick; the second interlayer is from about 0.5 to about 80 nm thick; and the third interlayer is from about 0.5 to about 50 nm thick.

Embodiments of the present invention include those wherein the magnetically soft underlayer comprises at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin antiferromagnetic coupling layers each comprised of at least one material selected from the group consisting of Ru and IrMn; the at least one magnetically hard perpendicular recording layer is a granular layer wherein adjacent grains thereof are physically separated and the at least one magnetically hard perpendicular recording layer has a hexagonal close-packed (hcp) crystal lattice with a <0002> out-of-plane growth orientation.

Preferably, the at least one magnetically hard perpendicular recording layer comprises at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of the Co-based magnetic alloys; (3) iron nitrides, and (4) iron oxides.

According to embodiments of the present invention, the layer stack further comprises: (iv) an amorphous or crystalline seed layer between the magnetically soft underlayer and the interlayer structure, the amorphous or crystalline seed layer comprising at least one material selected from the group consisting of: Ta, Au, Cu, Pd, TiCr, Pt, and Ag.

Another aspect of the present invention is an improved method of manufacturing a perpendicular magnetic recording medium, comprising steps of:

(a) providing a non-magnetic substrate having a surface; and (b) forming a layer stack over the substrate surface, the layer stack comprising, in overlying sequence from the substrate surface:

(i) a magnetically soft underlayer;
(ii) an amorphous or crystalline seed layer;
(iii) an interlayer structure for crystallographically orienting a layer of a perpendicular magnetic recording material formed thereon; and
(iv) at least one crystallographically oriented magnetically hard perpendicular recording layer;

wherein the interlayer structure provides the at least one magnetically hard perpendicular magnetic recording layer formed thereon with a hexagonal close-packed crystal lattice having a strong <0002> out-of-plane growth orientation and step (b) comprises sputter depositing, in overlying sequence from a surface of the amorphous or crystalline seed layer:

(1) a first interlayer of a first non-magnetic material in contact with the amorphous or crystalline seed layer, the first non-magnetic material containing Ru;

(2) a second interlayer of a second non-magnetic material in overlying contact with the first interlayer, the second non-magnetic material not containing Ru; and (3) a third interlayer of a third non-magnetic material in overlying contact with the second interlayer, the third non-magnetic material containing Ru.

According to embodiments of the present invention, step (b) comprises forming a first non-magnetic material with general formula RuX, where X is at least one element selected from the group consisting of: Mo, Ni, Cr, W, Zr, and Re; forming a second non-magnetic material with general formula Y, where Y is at least one element or alloy selected from the group consisting of: Mo, Cr, Ni, Ti, W, Zr, CrMo, CrW, CrMoZr, and NiMo; and forming a third non-magnetic material selected from the group consisting of: Ru, RuCr, RuMo, and RuW.

In accordance with embodiments of the present invention, step (b) comprises forming the first interlayer at a thickness from about 0.5 to about 50 nm; the second interlayer at a thickness from about 0.5 to about 80 nm; and the third interlayer at a thickness from about 0.5 to about 50 nm.

According to embodiments of the present invention, step (b) comprises forming the magnetically soft underlayer to include at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin antiferromagnetic coupling layers each comprised of at least one material selected from the group consisting of Ru and IrMn.

Embodiments of the present invention include those wherein step (b) comprises forming the at least one magnetically hard perpendicular recording layer as a granular layer wherein adjacent grains are physically separated and the at least one magnetically hard perpendicular recording layer has a hexagonal close-packed (hcp) crystal lattice with a <0002> out-of-plane growth orientation. Preferably, step (b) comprises forming the at least one magnetically hard perpendicular recording layer to include at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of the Co-based magnetic alloys; (3) iron nitrides, and (4) iron oxides.

According to embodiments of the present invention, step (b) comprises forming the amorphous or crystalline seed layer to include at least one material selected from the group consisting of: Ta, Au, Cu, Pd, TiCr, Pt, and Ag; and step (a) comprises providing a non-magnetic substrate comprised of a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

The present invention is based upon the discovery that very high areal recording density perpendicular magnetic recording media with improved crystallographic orientations and performance characteristics comparable to media fabricated with dual-layer stacked interlayer structures comprising first and second Ru-containing interlayers, as disclosed in the aforementioned U.S. Pat. No. 7,175,925 B2, can be fabricated at lower cost with substantially reduced Ru content by means of novel triple-layer stacked interlayer structures. Media fabricated according to the principles of the present invention typically utilize magnetic alloys as the material of the perpendicular recording layer(s), e.g., hcp Co-based alloys requiring strong <0002> preferred growth orientation, and can be reliably and controllably fabricated, for example, by conventional sputtering techniques, with optimum crystallographic properties (e.g., growth orientation) and physical separation of the grains of the component crystalline layers, particularly the interlayer(s) and perpendicular recording layer(s), by means of appropriate layer design, deposition conditions, and materials selection.

In perpendicular magnetic recording media fabricated according to the present disclosure, the triple-layer stacked interlayer structures serve to provide:

1. control of the crystallographic orientation of the at least one main recording layer;
2. control of the grain size and grain distribution of the at least one main recording layer;
3. reduction or elimination of exchange coupling between magnetically hard recording layers and magnetically soft layers; and
4. physical separation between adjacent grains of the at least one recording layer, which feature is particularly desirable and important when the latter is a granular type perpendicular recording layer, as for example, formed by a reactive sputtering process wherein a non-magnetic oxide, e.g., Co-oxide, forms in the boundaries between adjacent grains.

More specifically, the SMNR of perpendicular magnetic recording media fabricated according to the present invention is improved by increasing the strength of the preferred c-axis out-of-plane orientation of the at least one perpendicular main recording layer, while maintaining a small uniform grain size of the at least one layer. The preferred orientation of the at least one magnetic layer depends upon the structural properties of and the interactions between the various underlying layers of the media, as well as upon the nature of the substrate.

Figure 1:
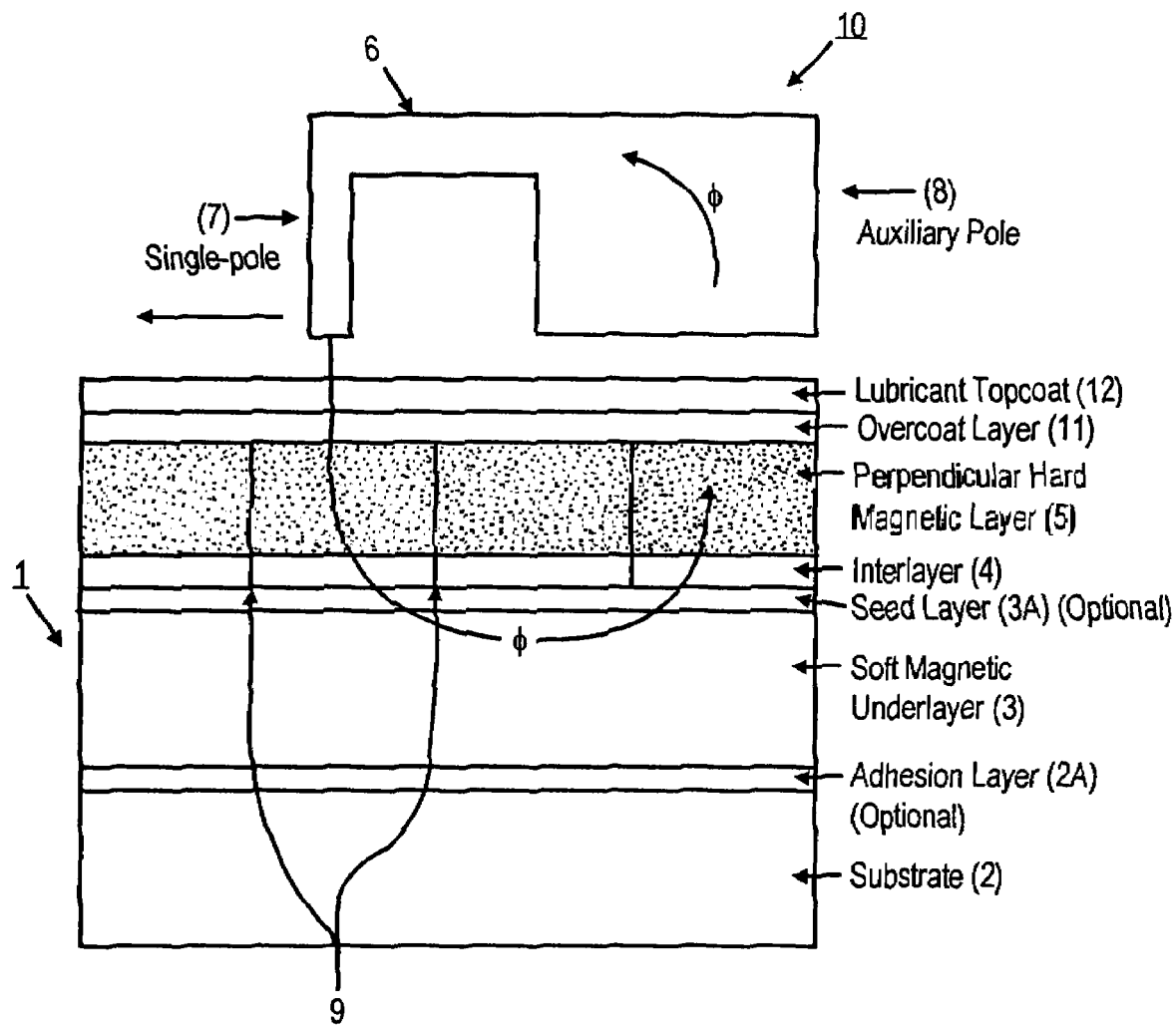
FIG. 1 schematically illustrates, in simplified cross-sectional view, a portion of a magnetic recording, storage, and retrieval system comprised of a single-pole transducer head and a conventional perpendicular type magnetic recording medium.
Figure 2:
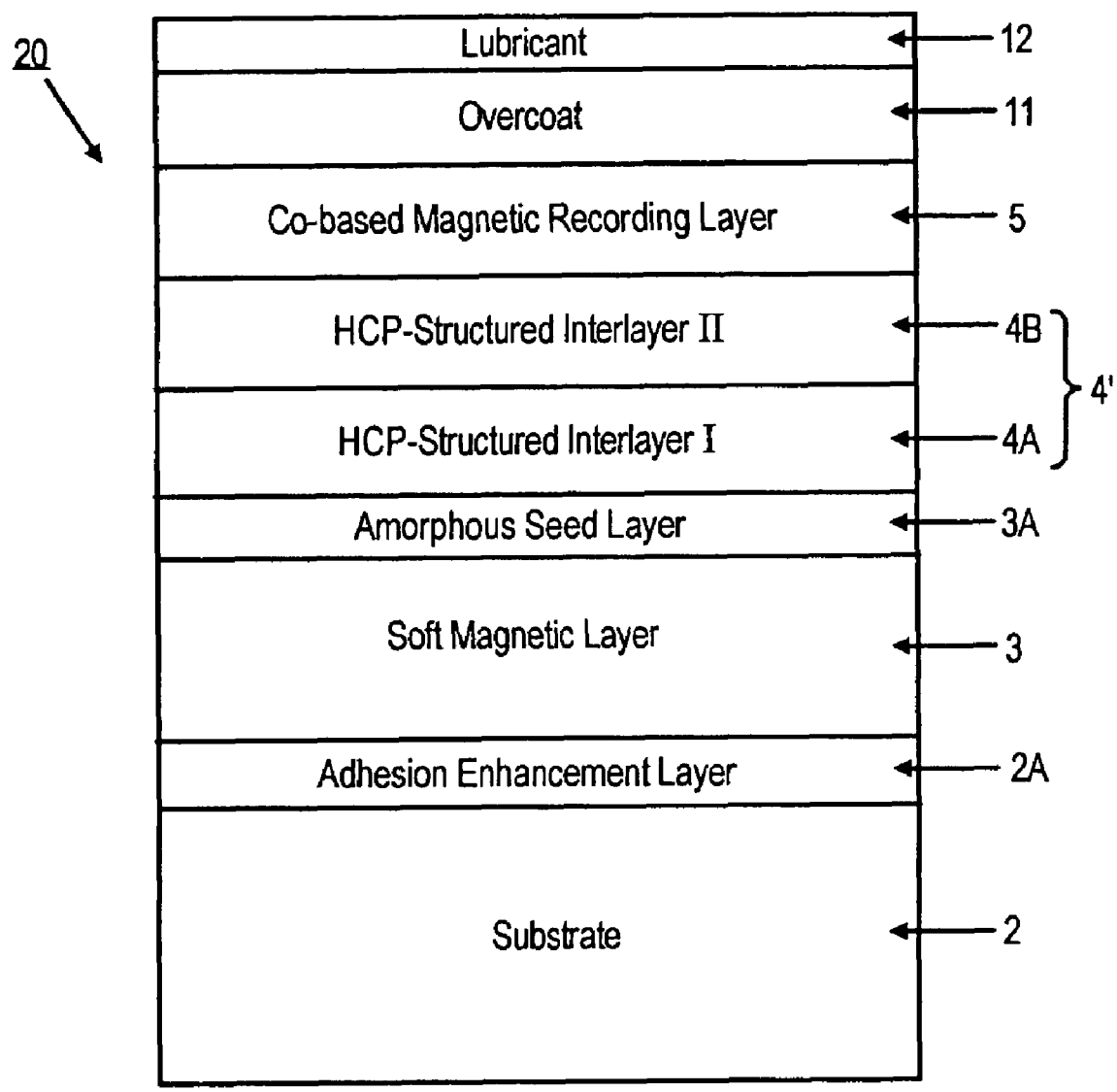
FIG. 2 schematically illustrates, in simplified cross-sectional view, a portion of a perpendicular magnetic recording medium comprising a dual-layer stacked interlayer structure as described in the aforementioned U.S. Pat. No. 7,195,925 B2.
Figure 3:
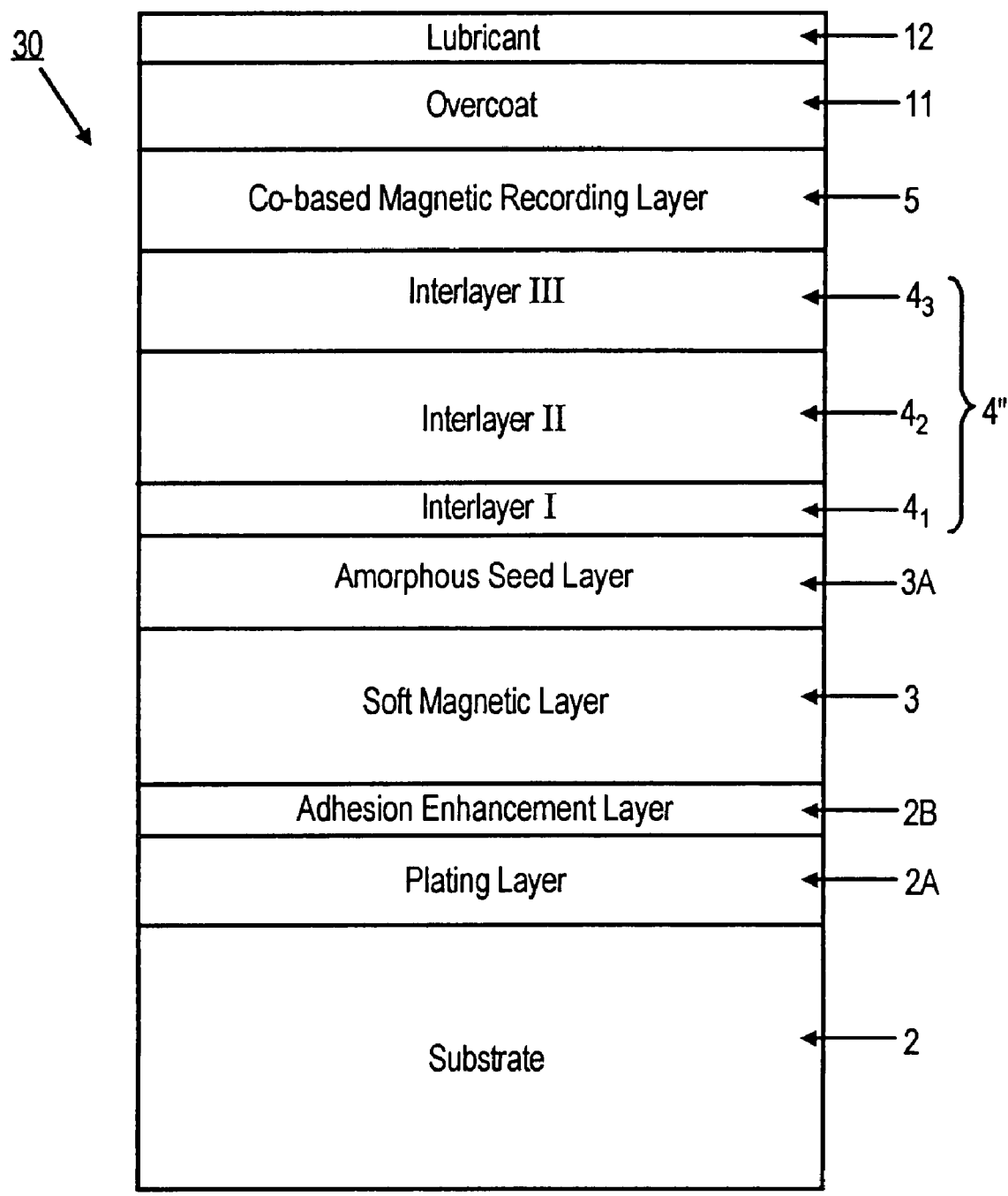
FIG. 3 schematically illustrates, in simplified cross-sectional view, a portion of a perpendicular magnetic recording medium comprising a triple-layer stacked interlayer structure fabricated according to the present disclosure.

Referring now to FIG. 3, schematically illustrated therein, in simplified cross-sectional view, is a portion of an illustrative, but non-limitative, embodiment of a perpendicular magnetic recording medium 30 fabricated according to the principles of the present invention. More specifically, perpendicular magnetic recording medium 30 resembles the perpendicular magnetic recording medium 20 of FIG. 2, and comprises a series of thin-film layers arranged in an overlying (stacked) sequence on a suitable non-magnetic substrate 2, and includes a soft magnetic underlayer 3, an optional amorphous or crystalline seed layer 3A, a stacked triple-layer, non-magnetic interlayer structure 4" according to the present invention, at least one perpendicularly oriented, magnetically hard (main) recording layer 5, preferably a granular perpendicular magnetic recording layer, a protective overcoat layer 11, typically comprised of a carbon (C)-containing material, such as diamond-like carbon (DLC), and a lubricant topcoat layer 12, typically comprised of a perfluoropolyether compound.

In accordance with embodiments of the present invention, e.g., as with hard disks, the non-magnetic substrate 2 is sufficiently thick as to provide medium 30 with a desired rigidity and comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof. Substrate 2 may further comprise, in overlying sequence from the surface thereof, a plating layer 2A and an adhesion layer 2B. A suitable material for plating layer 2A, as when substrate 2 is comprised of Al or an Al alloy, such as Al—Mg, is amorphous NiP, and suitable materials for adhesion layer 2B include Cr, CrTi, Ti, and TiNb.

Overlying substrate 2 is a magnetically soft underlayer 3, from about 50 to about 400 nm thick, preferably from about 80 to about 200 nm thick, typically comprised of at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, and FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin anti-ferromagnetic coupling (AFC) layers, each comprised of at least one material selected from the group consisting of Ru and IrMn.

An optional amorphous or crystalline seed or wetting layer 3A from about 1 to about 5 nm thick, preferably about 1-2 nm thick, and comprised of at least one material selected from the group consisting of: Ta, Au, Cu, Pd, Pt, TiCr, and Ag, may overlie soft magnetic underlayer 3, wherein the combination of the soft magnetic underlayer 3 and the amorphous or crystalline seed layer 3A provide a smoother surface for subsequent layer deposition thereon than is possible with the soft magnetic underlayer alone.

According to embodiments of the present invention, a stacked triple-layer non-magnetic interlayer structure 4" is interposed between the magnetically soft underlayer 3 (or an overlying amorphous or nano-crystalline seed layer 3A as described supra) and the at least one magnetically hard perpendicular recording layer 5, which non-magnetic interlayer structure 4" is described in detail below.

The at least one magnetically hard perpendicular recording layer 5 overlying the non-magnetic interlayer structure 4" is a granular type magnetically hard layer from about 5 to about 25 nm thick, preferably from about 7 to about 11 nm thick, and includes at least one layer comprised of at least one magnetic material selected from the group consisting of: Co-based magnetic alloys including one or more elements selected from the group consisting of: (1) Cr, Fe, Ta, Ni, Mo, Pt, V, Nb, Ge, Si, Al, B, Ti, Zr, Hf, and Pd; (2) oxides of the Co-based magnetic alloys (3) iron nitrides; and (4) iron oxides. Preferably, perpendicular recording layer 5 includes at least one layer of an hcp ferromagnetic alloy material with strong <0002> preferred growth orientation, preferably comprised of Co containing at least one element selected from the group consisting of Pt, Cr, Ta, B, Cu, W, Mo, and Nb.

Completing the layer stack of medium 30 are protective overcoat layer 11 atop recording layer 5, typically a layer of a carbon-containing material<100 Å thick, and a lubricant topcoat layer 12 atop the protective overcoat layer 11, typically a layer of a perfluoropolyether<50 Å thick.

According to the invention, interlayer structure 4" is a stacked triple-layer structure which, inter alia, crystallographically orients out-of-plane growth of the at least one overlying perpendicular magnetic recording layer 5 along a preferred growth direction. The stacked dual-layer interlayer structure utilizing Ru or Ru-based materials for layers $4_A$ and $4_B$ in medium 20 of FIG. 2 is thus replaced with a stacked triple-layer interlayer structure $4_1/4_2/4_3$ with a pair of Ru-based layers separated by a non-Ru-based layer, i.e., a RuX/

Y/Ru sandwich design, resulting in a substantial and significant reduction in Ru consumption vis-à-vis the stacked dual-layer design, while affording granular perpendicular recording media with substantially the same ultra-high magnetic and reliability characteristics heretofore provided by the stacked dual-layer interlayer structure $4_A/4_B$. In this regard, whereas other potential approaches for reducing Ru consumption, e.g., addition of ~10 at. % addition of an element or compound such as B, W, $TiO_2$, etc. may provide media with magnetic performance which is acceptable, performance is not superior to media with pure Ru interlayers. Considering the fact that these materials may be difficult to recycle and may incur a greater amount of defects upon sputter deposition, effectiveness of their use in cost reduction is problematic.

According to preferred embodiments of the invention, the stacked triple-layer structure 4″ is utilized together with the aforementioned hcp Co-containing magnetic alloys with <0002> preferred out-of-plane growth orientation, and comprises, in overlying sequence from the amorphous or nano-crystalline seed layer 3A:

(a) a first crystalline interlayer $4_1$ of a non-magnetic, Ru-containing material from about 0.5 to about 50 nm thick, and formed, e.g., by low pressure sputtering;

(b) a second crystalline interlayer $4_2$ of a non-magnetic material not containing Ru, from about 0.5 to about 80 nm thick, and formed, e.g., by sputtering; and Dual-layer interlayer structure (Control): RuX 150 Å/Ru 110 Å, where X=Cr;

Triple-layer interlayer structure: RuX 25 Å/Y 160 Å/Ru 110 Å, where X=Cr and Y=Cr or CrMo; and Dual-layer interlayer structure (Comparison): Y 150 Å/Ru 110 Å, where Y=Cr or CrMo.

Referring to Table I below, shown therein are magnetic performance parameters (measured at spinstand level) of granular perpendicular magnetic recording media comprising stacked dual-layer and triple-layer interlayer structures such as illustrated in FIGS. 2 and 3, respectively, wherein:

MFTAA=Mid-Frequency Track Average Amplitude;
LFTAA=Low-Frequency Track Average Amplitude;
Resolution=MFTAA/LFTAA;
TW65=65% of the slope of low frequency signal of the head;
FWD_OW=Forward Overwrite;
REV_OW=Reverse Overwrite;
PE_EFL=Error Rate;
OTC_EFL=Squeezed Error Rate;
WR_WDT=Write Width;
WPE=Write Plus Erase;
MOD=Modulation of Signal; and
eSNRm=Media Equalized Signal-to-Noise Ratio.

TABLE I

| Interlayer Structure | MFTAA (µV) | LFTAA (µV) | Resolution | TW65 (µin.) | FWD_OW (dB) | REV_OW (dB) | PE-EFL | OTC-EFL | WR-WDT | WPE | MOD | eSNRm |
|---|---|---|---|---|---|---|---|---|---|---|---|---|
| Dual Layer | 3281 | 5281 | 0.62 | 1.99 | −44.9 | −47.5 | −6.52 | −6.12 | 6.23 | 6.74 | 6.17 | 16.83 |
| Triple Layer | 3757 | 5607 | 0.67 | 1.84 | −45.2 | −48.6 | −6.82 | −6.28 | 6.30 | 6.51 | 5.70 | 16.72 |

(c) a third crystalline interlayer $4_3$ of a non-magnetic, Ru-containing material from about 0.5 to about 50 nm thick, and formed, e.g., by sputtering.

Preferably, the first crystalline interlayer $4_1$ is comprised of a non-magnetic material of general formula RuX, where X is at least one element selected from the group consisting of: Mo, Ni, Cr, W, Zr, and Re; the second crystalline interlayer $4_2$ is comprised of a non-magnetic material of general formula Y, where Y is at least one element or alloy selected from the group consisting of: Mo, Cr, Ni, Ti, W, Zr, CrMo, CrW, CrMoZr, and NiMo; and the third crystalline interlayer $4_3$ is comprised of a Ru-containing non-magnetic material selected from the group consisting of: Ru, RuCr, RuMo, and RuW.

Each of the constituent thin film layers 2A, 2B, 3, 3A, $4_1$, $4_2$, $4_3$, 5, and 11 of the layer stack of medium 30 is preferably formed by sputtering, and lubricant topcoat 12 may be formed in conventional fashion, e.g., by dipping, spraying, or vapor deposition.

The principles of and advantages afforded by the present invention will now be illustrated by reference to the following illustrative, but non-limitative, example, Table I, FIGS. 4 (A)-4 (B), and FIGS. 5 (A)-5 (C).

EXAMPLE

Granular perpendicular magnetic recording media corresponding to the media shown in FIGS. 2 and 3, respectively, were fabricated with the following stacked dual- and triple-layer interlayer structures:

The spinstand data of Table I clearly indicate that granular perpendicular magnetic recording media embodying the stacked triple-layer interlayer RuX/Y/Ru sandwich design according to the invention (e.g., as shown in FIG. 3) are capable of matching the performance of media with the stacked dual-layer RuX/Ru interlayer design (e.g., as shown in FIG. 2), notwithstanding the lattice mismatch between Ru and Cr.

Figure 4A:
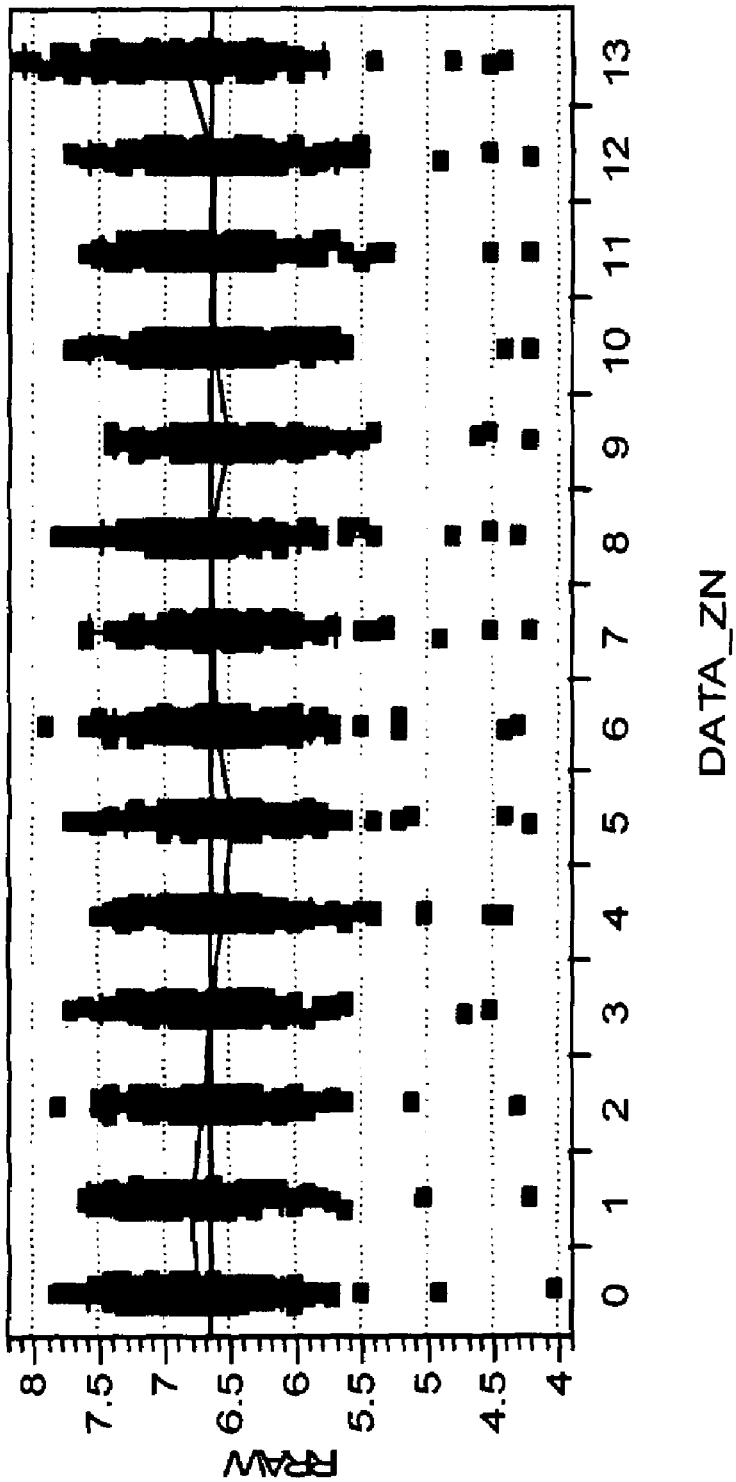
FIGS. 4 (A) and 4 (B) are graphs illustrating the drive level performance of perpendicular magnetic media comprising triple-layer stacked interlayer structures fabricated according to the present disclosure.
Figure 4B:
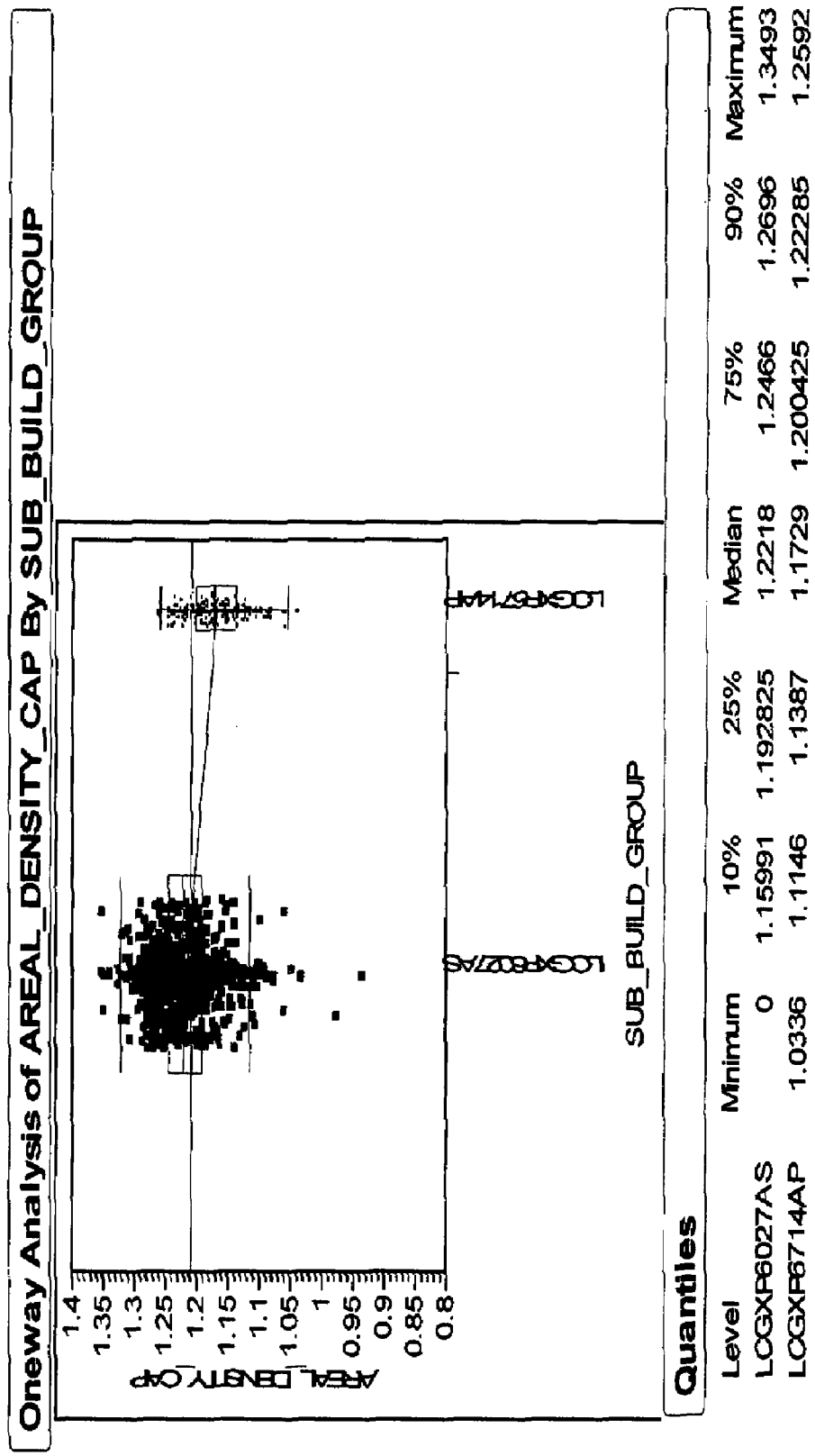

Adverting to FIGS. 4 (A) and 4 (B), which are graphs illustrating the drive level performance of perpendicular magnetic media comprising stacked triple-layer interlayer structures fabricated according to the present disclosure, the above observation that granular perpendicular magnetic recording media embodying the stacked triple-layer interlayer RuX/Y/Ru sandwich design according to the invention (e.g., as shown in FIG. 3) are capable of matching the performance of media with the stacked dual-layer RuX/Ru interlayer design (e.g., as shown in FIG. 2), is confirmed, again notwithstanding the lattice mismatch between Ru and Cr.

Figure 5A:
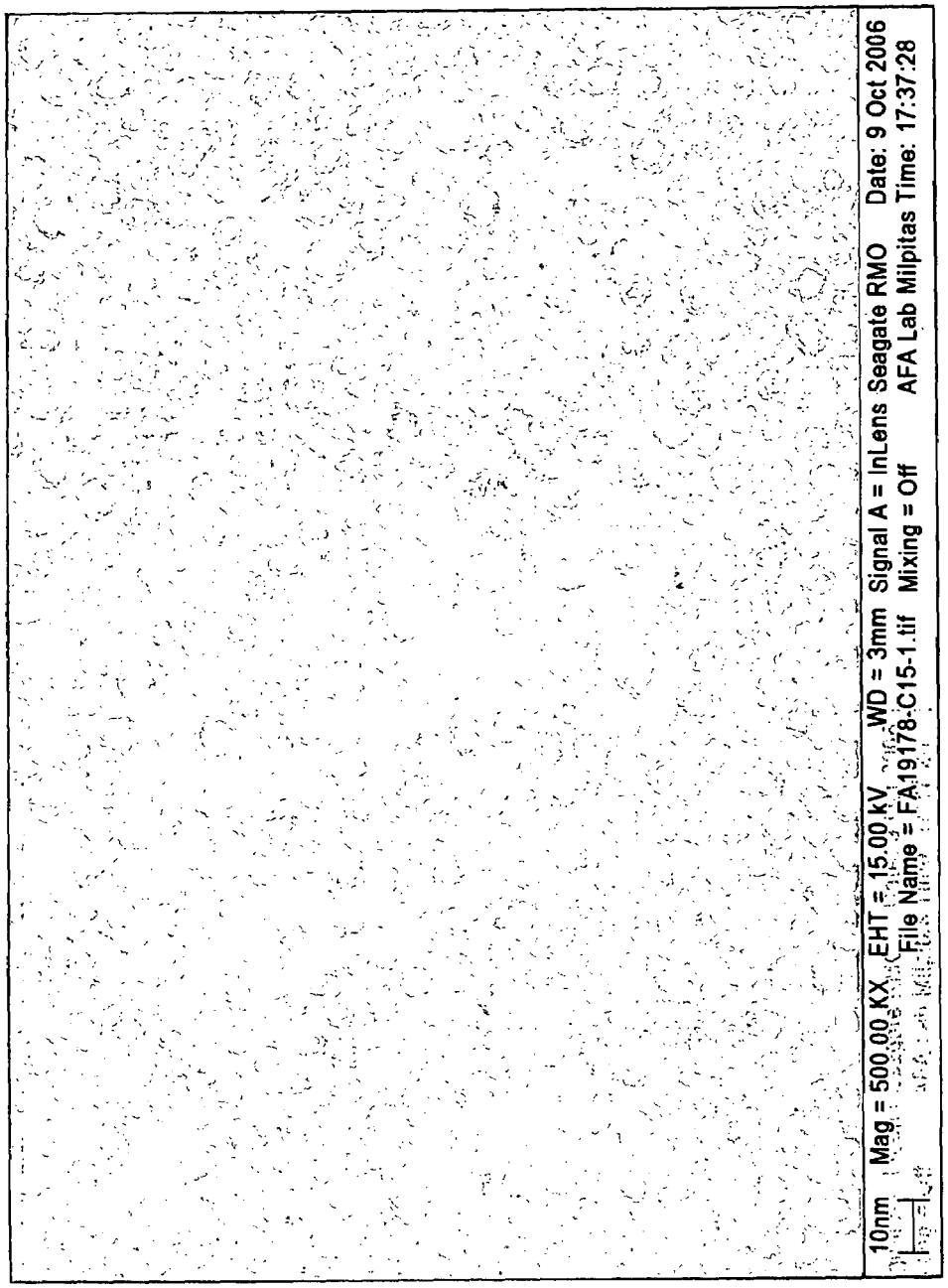
FIGS. 5 (A), 5 (B), and 5 (C) are photomicrographs obtained by ultra-high resolution ("UHR") scanning electron microscopy ("SEM") for facilitating grain size analysis of the uppermost layer of differently structured multi-layer interlayer stacks.
Figure 5B:
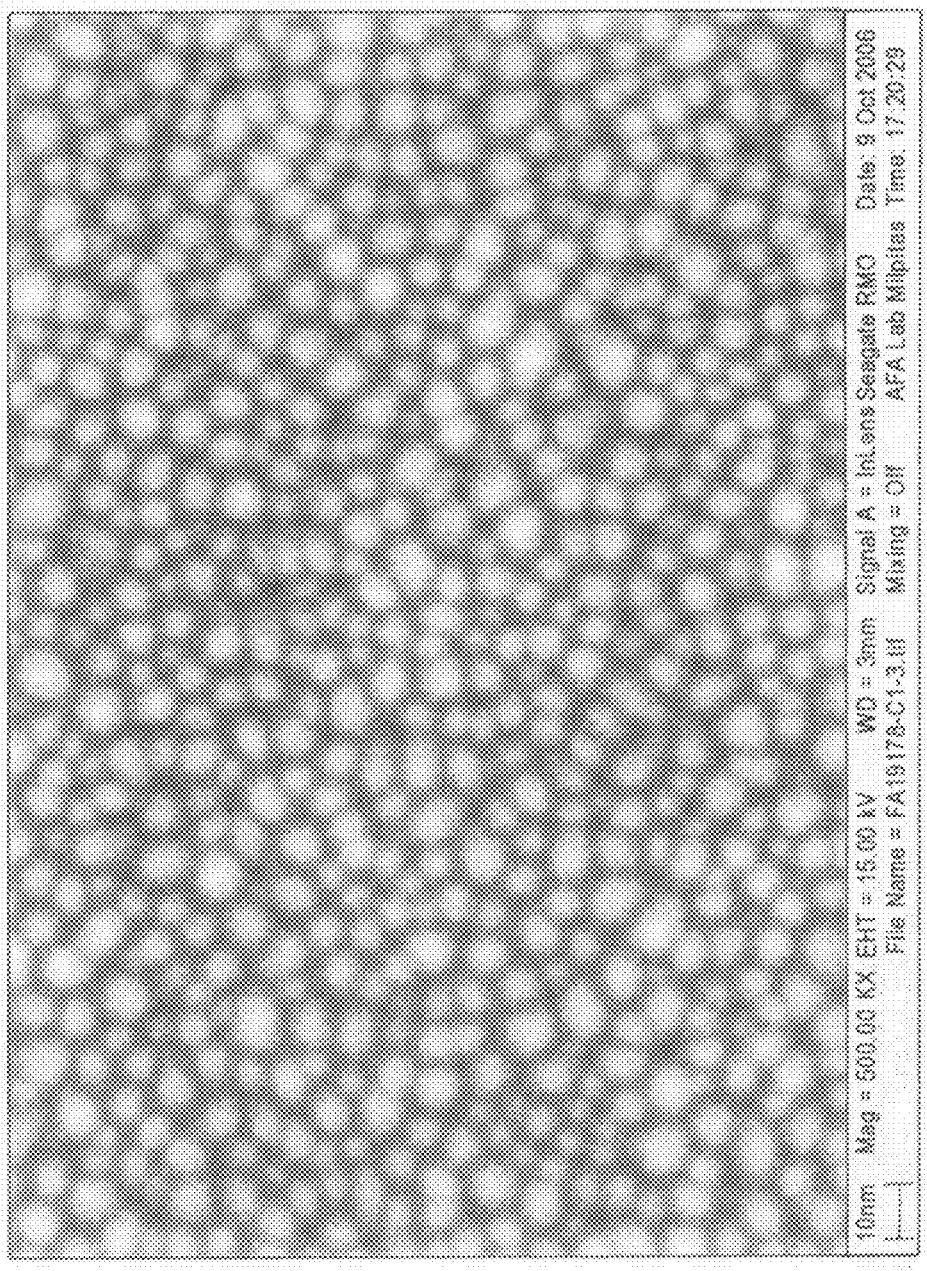
Figure 5C:
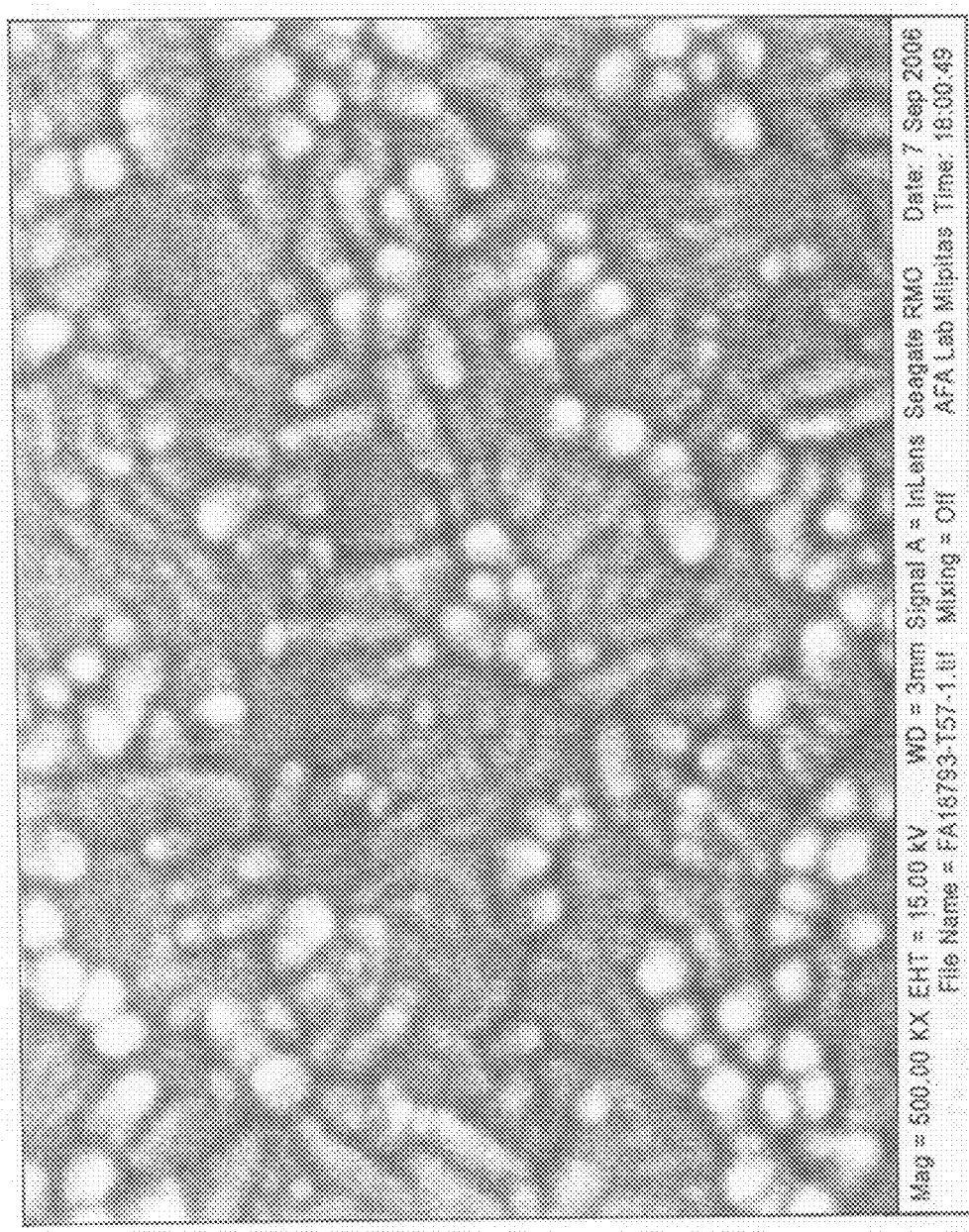

Referring to FIGS. 5 (A), 5 (B), and 5 (C), shown therein are photomicrographs of the uppermost, 110 Å thick Ru layer of the dual-layer interlayer structure (Control): RuX 150 Å/Ru 110 Å, triple-layer interlayer structure: RuX 25 Å/Y 160 Å/Ru 110 Å, and stacked dual-layer interlayer structure (Comparison): Y 150 Å/Ru 110 Å, respectively, obtained by ultra-high resolution ("UHR") scanning electron microscopy ("SEM") for facilitating grain size analysis of the uppermost layer of differently structured multi-layer intermediate layer stacks.

The grain size and size distribution, sigma (σ), for the stacked dual-layer interlayer structure (Control): RuX 150 Å/Ru 110 Å and stacked triple-layer interlayer structure: RuX 25 Å/Y 160 Å/Ru 110 Å, were observed to be close in value, i.e., 7.72 nm, σ=1.43 nm and 8.28 nm, σ=1.75 nm, respectively, confirming that partial replacement of Ru in the stacked dual-layer interlayer structure with Y in the stacked triple-layer interlayer structure does not significantly affect the grain size or grain size distribution. By contrast, full replacement of Ru with Y, as in the Comparison stacked dual-layer interlayer structure Y/Ru, has a detrimental affect on the structure of the upper R layer and magnetic performance of media comprising same.

Thus, partial replacement of Ru in a stacked dual-layer interlayer structure, such as shown in FIG. 2, with Y in a stacked triple-layer interlayer structure, such as shown in FIG. 3, permits a substantial and significant reduction in thickness of the lowermost RuX layer, e.g., from ~150 Å to ~25 Å in the illustrative, but non-limitative, example of the invention, resulting in a substantial and significant reduction in the amount of costly Ru required for fabrication of high performance media.

The present invention thus advantageously provides improved, high areal density, magnetic alloy-based perpendicular magnetic data/information and storage retrieval media including improved, more cost-effective non-magnetic interlayer structures which provide advantageous out-of-plane growth orientation of the magnetic recording layer, thereby affording improved media performance characteristics. The media of the present invention are especially useful when employed in conjunction with single-pole recording/retrieval transducer heads and enjoy particular utility in high recording density systems for computer-related applications. In addition, the inventive media can be fabricated by means of conventional media manufacturing technologies, e.g., sputtering.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A medium, comprising:
a non-magnetic substrate having a substrate surface; and
a layer stack formed over said substrate surface, said layer stack including:
   a magnetically soft underlayer;
   an interlayer structure above said magnetically soft underlayer; and
   at least one magnetic recording layer above said interlayer structure;
wherein said interlayer structure includes:
a first interlayer of a first non-magnetic material proximal said magnetically soft underlayer, said first non-magnetic material containing Ru, wherein said first interlayer includes a first thickness, and wherein said first non-magnetic material is of general formula RuX, where X is at least one element selected from the group consisting of: Mo, Ni, W, Zr, and Re;
a second interlayer of a second non-magnetic material above said first interlayer, said second non-magnetic material not containing Ru, wherein said second interlayer includes a second thickness; and
a third interlayer of a third non-magnetic material above said second interlayer, said third non-magnetic material containing Ru, wherein said third interlayer includes a third thickness.

2. The medium as in claim 1, wherein:
said second non-magnetic material is of general formula Y, where Y is at least one element or alloy selected from the group consisting of: Mo, Cr, Ni, Ti, W, Zr, CrMo, CrW, CrMoZr, and NiMo; and
said third non-magnetic material is selected from the group consisting of: Ru, RuCr, RuMo, and RuW.

3. The medium as in claim 2, wherein:
said first interlayer is from about 0.5 to about 50 nm thick; and
said third interlayer is from about 0.5 to about 50 nm thick, wherein said second thickness is greater than said first thickness and is greater than said third thickness.

4. The medium according to claim 1, wherein:
said magnetically soft underlayer includes at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin antiferromagnetic coupling layers each comprised of at least one material selected from the group consisting of Ru and IrMn.

5. The medium as in claim 1, wherein:
said at least one magnetic recording layer includes at least one magnetically hard perpendicular recording layer that is a granular layer wherein adjacent grains thereof are physically separated and said at least one magnetically hard perpendicular recording layer has a hexagonal close-packed (hcp) crystal lattice with a <0002> out-of-plane growth orientation.

6. The medium as in claim 5, wherein:
said at least one magnetically hard perpendicular recording layer includes at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of said Co-based magnetic alloys; (3) iron nitrides, and (4) iron oxides.

7. The medium as in claim 1, wherein said layer stack further includes:
an amorphous or crystalline seed layer between said magnetically soft underlayer and said interlayer structure.

8. The medium according to claim 7, wherein:
said amorphous or crystalline seed layer includes at least one material selected from the group consisting of: Ta, Au, Cu, Pd, TiCr, Pt, and Ag.

9. A method, comprising:
forming a layer stack over a surface of a non-magnetic substrate, said layer stack including:
a magnetically soft underlayer;
an amorphous or crystalline seed layer above said magnetically soft underlayer;

an interlayer structure above said amorphous or crystalline seed layer; and at least one magnetic recording layer above said interlayer structure, wherein said interlayer structure includes:

a first interlayer of a first non-magnetic material proximal said amorphous or crystalline seed layer, said first non-magnetic material containing Ru, wherein said first interlayer includes a first thickness, and wherein said first non-magnetic material is of general formula RuX, where X is at least one element selected from the group consisting of: Mo, Ni, W, Zr, and Re;

a second interlayer of a second non-magnetic material above said first interlayer, said second non-magnetic material not containing Ru, wherein said second interlayer includes a second thickness; and a third interlayer of a third non-magnetic material above said second interlayer, said third non-magnetic material containing Ru, wherein said third interlayer includes a third thickness.

10. The method according to claim 9, wherein said forming includes:

forming said second non-magnetic material with general formula Y, where Y is at least one element or alloy selected from the group consisting of: Mo, Cr, Ni, Ti, W, Zr, CrMo, CrW, CrMoZr, and NiMo; and forming said third non-magnetic material selected from the group consisting of: Ru, RuCr, RuMo, and RuW.

11. The method according to claim 10, wherein:

said forming includes forming said first interlayer at a thickness from about 0.5 to about 50 nm; and said third interlayer is at a thickness from about 0.5 to about 50 nm, and wherein further said second thickness is greater than said first thickness and is greater than said third thickness.

12. The method according to claim 9, wherein:

said forming includes forming said magnetically soft underlayer to include at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin antiferromagnetic coupling layers each comprised of at least one material selected from the group consisting of Ru and IrMn.

13. The method according to claim 9, wherein said at least one magnetic recording layer includes at least one magnetically hard perpendicular recording layer, and wherein said forming includes forming said at least one magnetically hard perpendicular recording layer as a granular layer wherein adjacent grains are physically separated and said at least one magnetically hard perpendicular recording layer has a hexagonal close-packed (hcp) crystal lattice with a <0002> out-of-plane growth orientation.

14. The method according to claim 13, wherein said forming includes forming said at least one magnetically hard perpendicular recording layer to include at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of said Co-based magnetic alloys; (3) iron nitrides, and (4) iron oxides.

15. The method according to claim 9, wherein said forming includes forming said amorphous or crystalline seed layer to include at least one material selected from the group consisting of: Ta, Au, Cu, Pd, TiCr, Pt, and Ag.

16. The method according to claim 9, wherein said non-magnetic substrate is comprised of a material selected from the group consisting of Al, NiP-plated Al, Al—Mg alloys, other Al-based alloys, other non-magnetic metals, other non-magnetic alloys, glass, ceramics, polymers, glass-ceramics, and composites and laminates thereof.

* * * * *